Oct. 17, 1967 G. FALBEL 3,348,058
RADIATION DETECTION SYSTEM HAVING WIDE FIELD OF VIEW
Filed Dec. 21, 1964

INVENTOR
GERALD FALBEL
BY Joseph Levinson
ATTORNEY

United States Patent Office 3,348,058
Patented Oct. 17, 1967

3,348,058
RADIATION DETECTION SYSTEM HAVING WIDE
FIELD OF VIEW
Gerald Falbel, Stamford, Conn., assignor to Barnes
Engineering Company, Stamford, Conn., a corporation
of Delaware
Filed Dec. 21, 1964, Ser. No. 419,939
3 Claims. (Cl. 250—216)

ABSTRACT OF THE DISCLOSURE

An optical means is provided for imaging radiation on a relatively small detector mounted on a transparent substrate and a field element is positioned behind the detector for imaging radiation which gets by the detector from the optical means onto the back of the detector. In one modification the field element and substrate are incorporated in a single optical element, and in another embodiment a dual field capability is provided.

---

Figure 1:
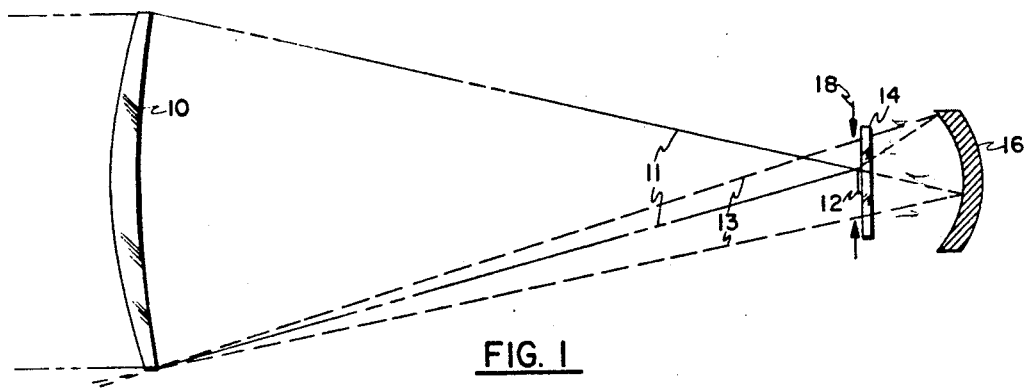

This invention relates to a radiation detection system, and more particularly to such a system for collecting energy from a wide field of view for application to a relatively small detector, and which further provides a dual field capability from a single detector.

Radiation detectors are used to obtain useful information from radiation which is generally collected by an optical system and applied to the detectors. The detector converts the incident radiant energy into other forms of energy, usually electrical signals which can be easily processed, displayed, and measured. The detectors utilized for electromagnetic radiation are thermal detectors or photodetectors. The sensitivity of these detectors is generally maximized by minimizing the required detector area. Therefore infrared systems generally use detectors with an active area of no more than a few square millimeters. The small detector size also provides better signal-to-noise ratios than larger detector sizes. However, the field of view of the small detector is limited by its size and by the optical system which collects and applies radiation thereto. For example, with a given detector size, to double its field of view it would be necessary to cut the focal length in half, or, in other words, the distance from the detector to the primary optic in half, or to double the size of the detector area. In the former, radiation may be lost by extreme aberrations of the optical system, and in the latter, of course, sensitivity is reduced because of the increased size of the detector.

Accordingly, it is an object of this invention to provide a novel radiation detection system which, for the same optical parameters, allows a wider field of view for a relatively small detector than has heretofore been obtained.

With respect to trackers and radiometers, there is a general requirement for a dual field capability, namely a relatively wide field for acquisition, and a narrow field for high accuracy tracking and high radiometric sensitivity unlimited by background noise. In the past this dual field capability has been achieved utilizing two separate optical systems focused on two separate reticles and detectors, or sequentially focused on a single reticle and detector by using a mechanical shutter.

It is a further object of this invention to provide a new and improved radiation detection system which provides a dual field capability while utilizing but a single optical system and a single detector.

In carrying out this invention in one illustrative embodiment thereof, an optical system is provided in which a single radiation detector is utilized with the optical system collecting and imaging radiation both on the front side and the back side of the detector. A radiation detector is mounted on a substrate which is transparent to the radiation being measured, and the detector is positioned in the focal plane of a primary optical means. A field element is positioned behind the detector for imaging radiation from the wide field of view of the optical system on the back side of the detector. In a modification, the substrate and the field element are combined in a single optical element. In a further modification, the wide field of view is blocked, which allows the system to be utilized with either a narrow field or a wide field of view, thus providing a dual field capability.

Figure 2:
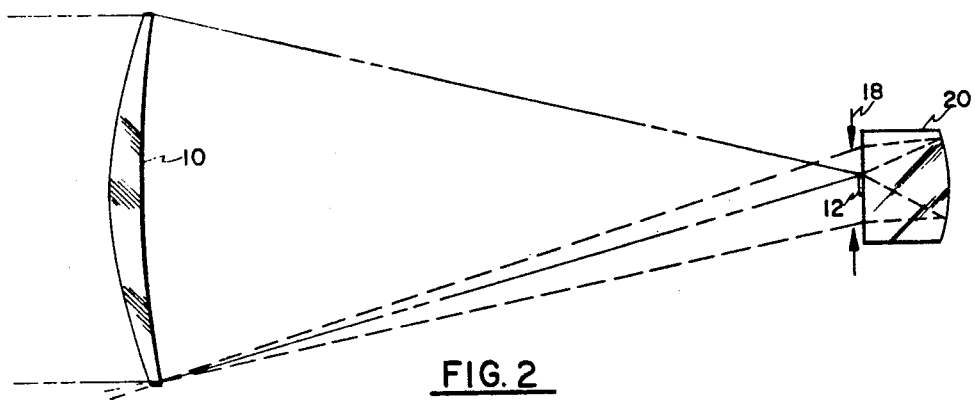
Figure 3:
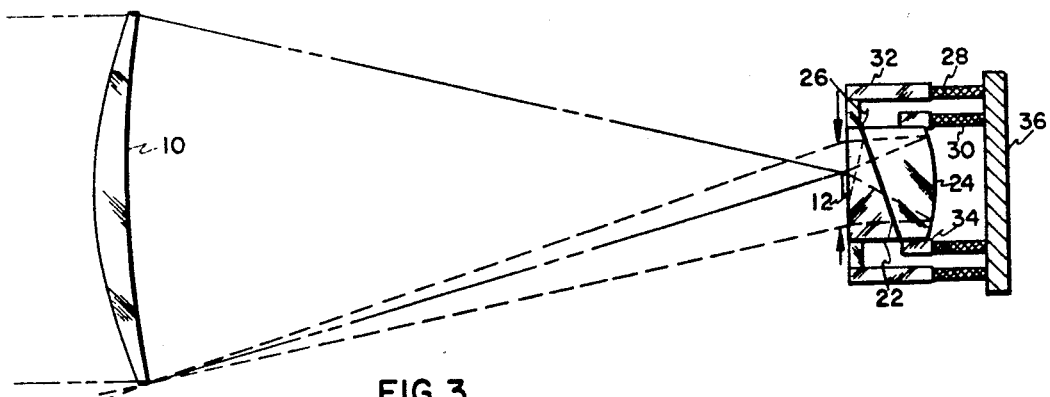

The invention, both as to organization and method of operation, together with further objects and advantages thereof, may best be understood by reference to the following description taken in connection with the accompanying drawings, in which, FIG. 1 is an optical schematic diagram of the radiation detection system embodied in this invention, FIG. 2 is a schematic diagram of another embodiment of the radiation detection system of this invention, and FIG. 3 is a schematic diagram of the radiation detection system of FIGS. 1 and 2 which allows the automatic selection of different fields of view.

Referring now to FIG. 1, the radiation detection system embodied in this invention includes a radiation detector 12 mounted on a substrate 14 with the detector 12 in the focal plane of a primary optical means 10. A field stop 18 is also located in the focal plane of the primary optical means 10, and a reflective field element 16 is positioned behind the detector 12 for focusing radiation on the back side of the detector 12. As can be seen from the ray trace provided on FIG. 1, a bundle of radiation defined by the lines 11 is focused by the primary optic 10 on the detector 12, the detector size defining the field stop of the system's narrow field of view. It will be further noted that a bundle of radiation defined by lines 13 from the primary optical means 10, which do not hit the detector flake 12, pass through the wider field stop 18 and are focused on the back side of the detector 12 by the ellipsoidal mirror or field element 16, which images the primary aperture defined by the field stop 18 on the back of the detector 12. The detector 12 may be either of the thermal, photovoltaic, or photoconductive variety, and the type of detector utilized will depend upon the type of radiation which is to be measured. It will also be apparent that the substrate 14 must be transparent to the wavelength of radiation which is to be measured. Thus, for example, in measuring radiation in the visible or near infrared, a lead sulphide detector could be mounted on a quartz substrate. In measuring longer wavelength infrared, a thermistor detector may be employed mounted on a germanium substrate. The primary optical means 10 is shown as a lens, but it will be apparent to those skilled in the art that a totally reflective type primary optic may be employed.

It will be apparent from FIG. 1 that the radiation detection system illustrated therein is capable of gathering radiation which otherwise would be lost. This amounts to effectively increasing the detector size without actually so doing. Stated in another way, the detector 12 as shown in FIG. 1 is provided with wider field coverage for a given aperture than could be obtainable without changing the optics or the detector size. The field element 16 and the transparent substrate 14 thus allow the collection of energy through a wide field of view for a small radiation detector.

A variation of the basic configuration shown in FIG. 1 is that shown in FIG. 2, in which the detector 12 is immersed on a single optical element 20 which combines the functions of the transparent substrate 14 and the field element 16 of FIG. 1. The element 20, in addition to combining the functions of the detector substrate 14 and the ellipsoidal (or spherical) field element 16, provides an immersion gain for the wide field of view of the system. The ray trace as shown in FIG. 2 is roughly equivalent to that obtained with a germanium immersed thermistor bolometer. Additional immersion gain is obtained because the rays in the element 20 are reflected at less severe angles than would be the case with FIG. 1.

As previously pointed out, the size of the detector 12 defines the narrow field of view of the system, whereas the field stop 18 provides the wide field of view of the instrument. A large ratio of wide to narrow field can be obtained in this system, and the ratio can be increased by changing the primary optical means. For radiometric and tracking systems it may be desirable, under certain circumstances, to shut off the wide field of view when a point target enters the narrow field. In such a case the field stop 18 can be adjusted to shut off the wide field of view. If it is not desirable to use mechanical means for excluding the wide field of view, this feature can be obtained quite directly in the proposed system by utilizing the configuration shown in FIG. 3. FIG. 3 employs the use of a frustrated internal reflection modulator which is more fully described in Ser. No. 330,039, entitled "Frustrated Internal Reflection Modulator and a Method of Making the Same," filed by R. W. Astheimer. As applied to the present system, the optical element 20 of FIG. 2 is divided into elements 22 and 24, with element 22 performing the function of the transparent substrate, and element 24 performing the function of the field element 16. The elements 22 and 24 are separated by an interface 26. The element 24 is driven by a piezoelectric cylinder 30 through a linkage element 34, and the transparent substrate 22 is driven by a piezoelectric cylinder 28 through the linkage element 32. The piezoelectric elements 28 and 30 are mounted on a common base 36. Electrical signals are applied in push-pull to the piezoelectric devices 28 and 30, which control the interface 26. When the elements 22 and 24 are in abutting relationship, so that the interface 26 is closed, the operation of the system is the same as that described in connection with FIG. 2. However, when the interface 26 is opened by the application of signals to the piezoelectric drive means 28 and 30, radiation does not pass through the interface, and is reflected therefrom and not focused on the back of the detector 12. This provides a convenient, non-mechanical and automatic means of eliminating the wide field of view from the detector 12. Of course, the problem which remains in this field switching configuration is the ability of the system to sense when the target is in the narrow field. This may be accomplished by providing a slow modulation of the frustrated internal reflection modulator, which could be sensed on top of the received radiation or tracking signal only in the wide field. In the narrow field, the radiation would not reach the interface gap 26, and would therefore not be modulated, in which case the interface 26 could be opened to prevent background radiation from the wide field of view from reaching the detector 12.

The application of the radiation detection system as described in connection with FIG. 3, of course, is only a specialized use of the system, and it is of course not restricted to this use, but has a wide range of applications in photometry, spectrometry, and radiometry where it is desired to utilize a relatively small detector having a wide field of view measuring capability.

Since other modifications, varied to fit particular operating requirements and environments, will be apparent to those skilled in the art, the invention is not considered limited to the example chosen for purposes of disclosure, and covers all changes and modifications which do not constitute departures from the true spirit and scope of this invention.

What I claim as new and desire to secure by letters patent is:

1. A radiation detection system for gathering radiation from a large field of view on a relatively small radiation detector, comprising
    (a) a radiation detector mounted on a substrate which is transparent to the radiation being measured,
    (b) a primary optical means having said detector positioned in its focal plane for applying radiation to the front of said detector,
    (c) a wide field stop positioned in the focal plane of said primary optical means which defines the system's wide field of view, and
    (d) a field element positioned behind said detector for imaging radiation from the wide field of view of said primary optical means which passes the front of said detector onto the back of said radiation detector.

2. The radiation detection system set forth in claim 1 wherein said substrate and said field element are incorporated in a single optical element.

3. The radiation detection system set forth in claim 1 wherein said substrate and field element are abutting in one position and are driven by a piezoelectric transducer to provide a separation between the substrate and said field element which effectively shuts off the wide field of view of the system, thereby providing the system with a dual field of view capability.

References Cited
UNITED STATES PATENTS

| | | | |
|---|---|---|---|
| 2,447,344 | 8/1948 | Kliever | 250—203 X |
| 2,964,636 | 12/1960 | Cary | 250—216 X |
| 3,098,934 | 7/1963 | Wilson et al. | 250—203 |
| 3,218,909 | 11/1965 | Fain. | |
| 3,165,632 | 1/1965 | Hansen | 250—235 X |
| 3,260,849 | 7/1966 | Polye | 250—83.3 X |

WALTER STOLWEIN, *Primary Examiner.*